United States Patent [19]
Sendelweck et al.

[11] Patent Number: 5,079,623
[45] Date of Patent: Jan. 7, 1992

[54] SIGNAL CLAMP FOR A DUAL FUNCTION INPUT TERMINAL OF A "ONE-CHIP" TELEVISION SIGNAL PROCESSING IC

[75] Inventors: Gene K. Sendelweck; Thomas D. Gurley, both of Indianapolis, Ind.

[73] Assignee: Thomson Consumer Electronics, Inc., Indianapolis, Ind.

[21] Appl. No.: 515,494

[22] Filed: Apr. 30, 1990

[51] Int. Cl.$^5$ ............................................. H04N 5/59
[52] U.S. Cl. ........................................ 358/74; 358/169
[58] Field of Search ........................ 358/74, 169, 243

[56] References Cited

U.S. PATENT DOCUMENTS 4,253,110  2/1981  Harwood et al. ................... 358/74
4,689,668  8/1987  Sutherland, II et al. ............ 358/74
4,947,253  8/1990  Neal ................................. 358/169

Primary Examiner—John W. Shepperd
Attorney, Agent, or Firm—Joseph S. Tripoli; Peter M. Emanuel

[57] ABSTRACT

A so-called "one-chip" television IC includes a dual purpose input terminal for receiving a control signal representing an image property, such as a contrast, and also a signal having an amplitude within a predetermined range for enabling a test mode of operation. The control signal is generated by at least first and second control circuits. The first control circuit provides a first control signal set by a user. The second control circuit provides a second control signal in response to the image content of an image-representative signal produced by the integrated circuit, and may comprise a beam current limiter responsive to the beam current drawn by an image reproducing device or a circuit responsive directly to the image-representative signal. The first and second control signals are combined to produce a combined control signal which is applied to the dual purpose input terminal. A circuit is coupled to the dual purpose input terminal to inhibit a voltage which extends into the predetermined range corresponding to the test mode from being developed at the terminal in response to the combined control signal.

20 Claims, 1 Drawing Sheet

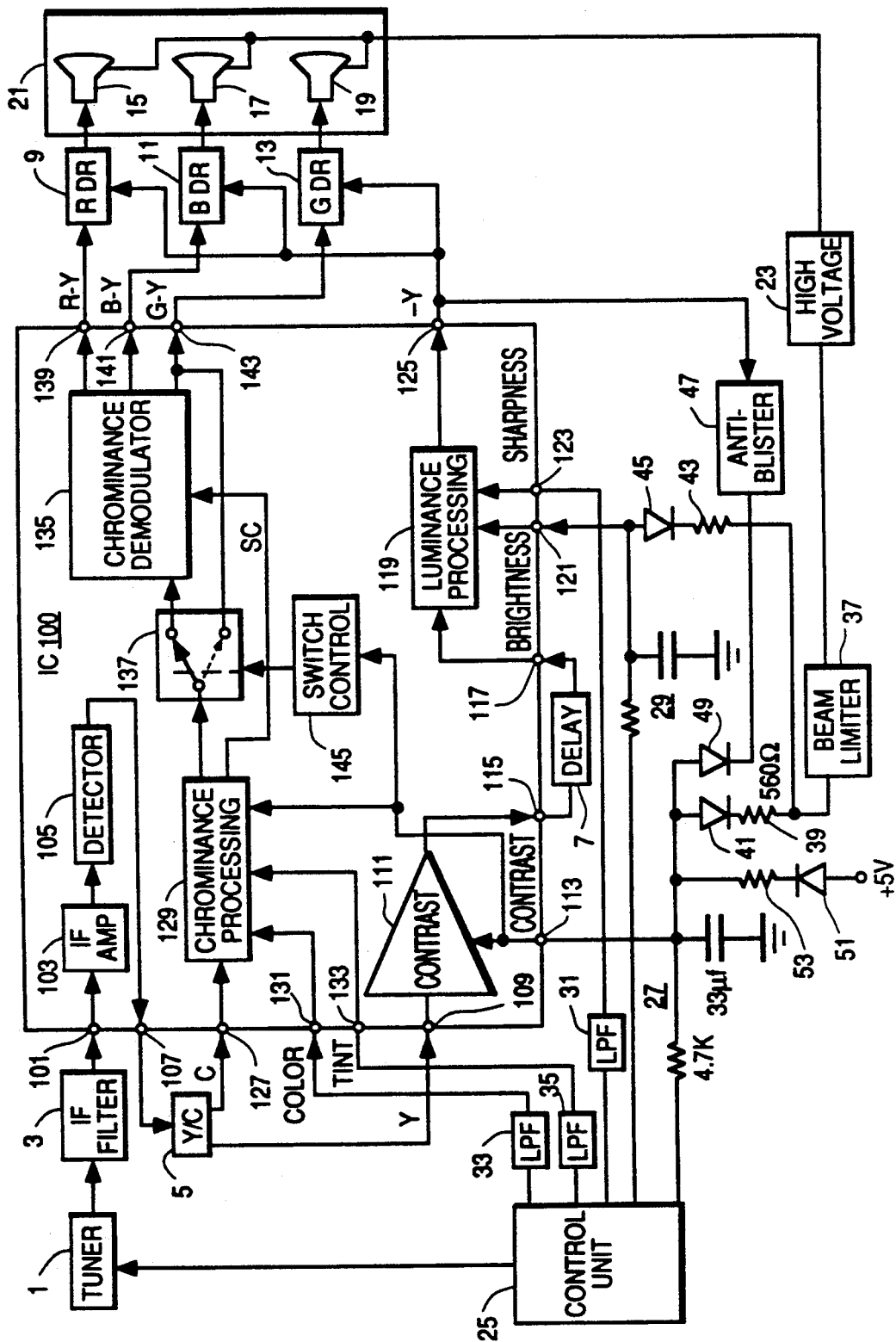

SIGNAL CLAMP FOR A DUAL FUNCTION INPUT TERMINAL OF A "ONE-CHIP" TELEVISION SIGNAL PROCESSING IC

FIELD OF THE INVENTION

The present invention concerns a signal clamp for a dual function input terminal of a signal processing system which may be incorporated in a single integrated circuit.

BACKGROUND OF THE INVENTION

A large portion of the signal processing section of a modern television receiver is incorporated within a single integrated circuit (IC) sometimes referred to as a "one-chip" television IC. It is desirable that such ICs perform as many functions as possible to reduce the amount of external circuitry that is required. In addition to the "normal" signal processing functions, an IC often includes provisions for testing and/or aligning the IC and associated external circuitry. With the increased complexity of signal processing ICs, such as those employed in television receivers, it is frequently found that there are not enough IC terminals (commonly also referred to as "pins") available for all of the required functions. Accordingly, some terminals are used for dual purposes.

One common use of a "dual purpose" terminal is to receive an input signal which is used for signal processing during the "normal" operating mode of the IC and also to receive another input signal which is used to enable a "test" mode of the IC. It is intended that the amplitudes of the two input signals remain within two different ranges corresponding to the two modes of operation so that the signal intended for signal processing does not cause the test mode to be activated. This is readily accomplished when the two signals are each generated in a predictable manner.

The present invention is directed to the situation in which it may not be possible to ensure that one of the two input signals remains in its respective amplitude range. The present inventors have recognized that this situation may occur when the input signal which is associated with the "normal" signal processing operation is generated as a combination of signals produced by two or more circuits which operate more or less independently of each other.

By way of example, the TA8680 "one-chip" television IC available from Toshiba Corp. includes provisions for using the picture contrast control terminal to enable a test mode. It is intended that the amplitude of the contrast control voltage coupled to the contrast control terminal remain in a predetermined range for normal signal processing operations. When it is desired to enable the test mode, a test mode enabling DC voltage, well below the range of the contrast control voltage, is coupled to the contrast control terminal. This arrangement works quite well as long as the contrast control voltage remains within the required range. It may be possible to meet this criteria by properly selecting component values when the contrast control voltage is generated by a user contrast adjustment circuit. However, it has been recognized by the present inventors that for certain situations requiring one or more image content responsive beam current limiting circuits to be coupled to the contrast control terminal, it may not be possible to ensure that the contrast control voltage remains in the required range under all operating conditions. As a result, the test mode may be undesirably activated, causing a disconcerting image disturbance.

SUMMARY OF THE INVENTION

The present invention concerns a signal processing system of the type described above having a first or normal mode of operation during which a received signal is processed in a predetermined manner to produce an output signal, and a second mode of operation, such as a test mode, during which the first mode of operation is inhibited. The selection of modes is controlled by the amplitude of an input signal developed at a dual purpose input terminal. The input terminal receives a control signal for controlling a property of the output signal during the signal processing mode of operation. A signal having an amplitude within a predetermined range is selectively coupled to the input terminal when it is desired to activate the second mode of operation. Apparatus is coupled to the dual purpose input terminal for inhibiting the input signal from extending into the predetermined range for activating the second mode of operation in response to the signal processing control signal. However, the inhibiting apparatus does not prevent the input signal from assuming the amplitude within the predetermined range when it is desired to activate the second mode of operation. The inhibiting apparatus comprises a so called "soft signal clamp" which is selectively activated when the amplitude of the control signal reaches a predetermined threshold near the predetermined range for activating the second mode of operation.

This arrangement is particularly desirable when the control signal is generated as a combination of control signals produced by two or more control units which operate more or less independently of each other and which may, as a result, produce a combined control signal which has an amplitude within the predetermined range for activating the second mode of operation. This and other aspects of the invention will be described in detail with respect to a contrast control system of a television receiver employing the TA8680 IC referred to above.

BRIEF DESCRIPTION OF THE DRAWING

The present invention will be described with reference to the accompanying Drawing containing a single FIGURE in which a schematic diagram of the preferred embodiment of the present invention is shown.

DETAILED DESCRIPTION OF THE PREFERRED EMBODIMENT

A large portion of the television receiver shown in the sole FIGURE is incorporated in a so called "one-chip" television IC 100. Those sections of the television receiver within IC 100 and the input and output terminals of IC 100 are identified with reference in the "100s". In the illustrative embodiment IC 100 is a Toshiba TA8680 referred to above. Only those portions of the television receiver in general and of IC 100 in particular which relate to the preferred embodiment of the invention are shown in the Figure.

Turning now specifically to the sole Figure, a tuner selects and heterodynes the RF signal corresponding to a selected channel to produce an IF signal. The IF signal is filtered by an IF filter 3 and the resultant signal is coupled via an IC input terminal 101 to an IF amplifier within IC 100. The amplified IF signal is demodulated by a detector 105 to produce a baseband composite video signal containing luminance (Y) and chrominance (C) components. The composite video signal is coupled via an IC output terminal 107 to a luninance/-chrominance separator 5 which separates the composite video signal into a luminance (Y) signal and a chrominance signal (C).

The luminance signal produced by Y/C separator 5 is coupled via an IC input terminal 109 to a luminance signal processing channel of IC 100. The luminance processing channel includes a gain controlled amplifier 111 within IC 100. The gain of amplifier 111 is controlled in response to a contrast control voltage coupled to an IC input terminal 113 in order to control the contrast property of the received luminance signal and therefore the contrast of a reproduced image. The amplified luminance signal is coupled via an IC output terminal 115 to a delay line 7. Delay line 7 delays the luminance signal to compensate for the delay the chrominance signal is subjected to in its processing channel to be described below. The delayed luminance signal is coupled via an IC input terminal 117 to another luminance processing section 119 of IC 100. Among other functions, luminance processing section 119 controls the DC content of the luminance signal and therefore the brightness of the reproduced image in response to a brightness control voltage coupled to an IC input terminal 121 Luminance processing section 119 also controls the high frequency content of the luminance signal and therefore the sharpness of the reproduced image in response to a sharpness control voltage coupled to an IC input terminal 123. The processed luminance signal (−Y) is coupled to an IC output terminal 125. The symbol −Y indicates that black-going portions of the reproduced image correspond to positive-going portions of the luminance signal and white-going portions of the reproduced image correspond to negative-going portions of the luminance signal.

The chrominance signal produced by Y/C separator 5 includes a color subcarrier which is modulated by a signal which is the vector sum of two color difference signals. It also includes a color burst component which has the same frequency as the color subcarrier and is used to demodulate the color subcarrier. The chrominance signal is coupled via an IC input terminal 127 to the chrominance signal processing channel of IC 100. The chrominance signal processing channel includes an input chrominance processing section 129 which, among other functions, controls the amplitude of the received chrominance signal in order to control the color saturation of the reproduced image in response to a color control voltage coupled to an IC input terminal 131. Chrominance processing section 129 also regenerates the color subcarrier utilizing the color burst component and controls its phase in order to control the tint (or hue) of the reproduced image in response to a tint control voltage coupled to an IC input terminal 133. The amplified chrominance signal and the regenerated color subcarrier (SC) are coupled to a chrominance demodulator 135. The chrominance signal is coupled to chrominance demodulator through a switching section 137, the function of which will be described below. Chrominance demodulator demodulates the color subcarrier utilizing the regenerated and tint controlled color subcarrier to produce red, green and blue color difference signals (R−Y, B−Y and G−Y). The R−Y, B−Y and G−Y color difference signals are coupled to respective IC output terminals 139, 141 and 143.

The R−Y, B−Y and G−Y color difference signals produced by IC 100 are coupled to respective ones of red (R), green (G) and blue (B) drive circuits 9, 11 and 13, where they are combined with the −Y luminance signal produced by IC 100 to produce R, G and B drive signals suitable for driving respective picture tube electron guns. Respective electron beams are generated by respective electron guns in response to respective ones of the R, G and B drive signals. In the illustrative embodiment, R, G and B drive signals are shown coupled to respective electron guns of respective individual red, green and blue picture tubes 15, 17 and 19 included within a projection display system 19 since the problem to be described below is accentuated in a projection type of television receiver. However, it will be appreciated by those skilled in the art that the R, G and B drive signals may be alternatively be coupled to respective electron guns of a single picture tube.

A high voltage power supply 23 provides power to picture tubes 15, 17 and 19. A so called "beam current" is drawn by each of picture tubes 15, 17 and 19 from high voltage power supply 23 and corresponds to the intensity of the respective electron beam.

Various user adjustable DC control voltages for controlling various portions of the receiver described so far are generated by a control unit 25. Control unit 25 may include various digital to analog converters (DACs) for generating the DC control voltages and a microprocessor which controls the DACs in response to user initiated command signals generated, for example, by a remote control transmitter. The so called "TELE-KAT" television control IC available from Motorola Semiconductor Products, Inc. includes such provisions, as well as a phase locked loop tuner controller. The user adjustable DC control voltages may also be generated by other manually adjustable devices such as potentiometers.

The user adjustable DC control voltages for controlling the contrast, brightness, sharpness, color and tint of the reproduced image are coupled to respective IC input terminals 113, 121, 123, 131 and 133 through respective low pass filters (LPFs) 27, 29, 31, 33 and 35.

In the illustrative embodiment, increases of the control voltages cause corresponding increases of the respective properties, and decreases of the control voltages causes corresponding decreases of the respective properties.

In addition to the contrast and brightness control voltages generated by control unit 25 in accordance with adjustments made by a user, additional contrast and brightness control voltages are generated by a beam current limiter circuit 37 in response to excessive beam current being drawn from high voltage power supply 23 by picture tubes 15, 17 and 21. Beam current limiter 37 senses the magnitude of the beam current and generates a control voltage for lowering the contrast and also a control voltage for lowering the brightness, but to a lesser degree than the contrast, until a certain threshold threshold is reached. Thereafter, beam current limiter 37 increasingly causes the brightness to decrease.

More specifically, beam limiter 37 converts the beam current to an inversely related voltage. As the beam current increases, the representative voltage decreases. The output of beam current limiter 37 is coupled to contrast control terminal 113 of IC 100 through a series circuit including a resistor 39 and a diode 41, and to brightness control terminal 121 of IC 100 through a series circuit including a resistor 43 and a diode 45. As the beam current increases, diodes 41 and 45 are rendered conductive to thereby lower the voltages at respective control terminals 113 and 121 of IC 100 in order to provide the the beam current limiting operation described above.

In certain "direct view" display systems, as well as in projection display systems, it is desirable to increase the light output of the display device. This may be accomplished by increasing the amplitude of the picture tube drive signals. In that case, it is desirable to protect the the shadow mask of the picture tubes or tube from warping or "blistering" in response to the increased drive signals. A conventional beam current limiter responds to the average beam current. Therefore, a beam current limiter is usually inadequate by itself for detecting and inhibiting instantaneously high electron beam intensities which may cause localized shadow mask heating and possible blistering.

A so-called "anti-blister" circuit is responsive to the amplitude and duty cycle of white-going peaks of an image-representative signal such as the luminance signal. Accordingly, an anti-blister circuit is useful in a direct view display system for preventing shadow mask blistering. It has been found that the characteristics of an anti-blister circuit are also useful in both direct view and projection systems to control sudden changes of average picture level.

Accordingly, the illustrative embodiment includes a anti-blister circuit 47 for generating an additional contrast control signal for lowering the contrast in response to the amplitude and duty cycle of white-going peaks of the −Y luminance signal produced at output terminal 125 of IC 100. The output of anti-blister circuit 47 is coupled to contrast control terminal 113 of IC 100 through an isolation diode 49. A suitable anti-blister circuit is disclosed in U.S. patent application Ser. No. 340,652 filed for G. K. Sendelweck (one of the present inventors) on Apr. 20, 1989. A similar circuit is employed in RCA brand television receivers utilizing chassis of the CTC-159S type and is shown in "RCA/GE Color Television Service Data—CTC 159/158", published by Thomson Consumer Electronics, Inc. Indianapolis, Ind. in 1989.

The portions of one-chip television IC 100 so far described, with the exception of switching section 137, pertain to its normal or signal processing mode of operation. One-chip television IC 100 also has a test mode of operation intended to be used during the manufacture of the television receiver for testing or alignment purposes. Due to the complexity of IC 100, there are not enough IC terminals available for all the required functions which are necessary for both the normal and the test modes. Accordingly, certain terminals of IC 100 are used for dual purposes. These aspects of IC 100 will now be specifically discussed.

Switching section 137 is included within IC 100 to enable output terminal 137 to be used to provide the G−Y color difference signal during the normal mode of operation, and to provide the output signal of chrominance processing section 129 during a test mode. Specifically, during the normal or signal processing mode, switching section 137 couples the chrominance signal produced by chrominance processing section 129 to chrominance demodulator 135. This is symbolically represented by the solid line position of the arm of the switch shown within block 137. As a result, the R−Y, B−Y and G−Y color difference signals are produced at respective IC output terminals 139, 141 and 143. During the test mode, chrominance demodulator 135 is effectively bypassed. This is symbolically represented by the connection of the phantom line position of the arm of the switch shown within block 137 and the conductor which bypasses chrominance demodulator 135. This test mode enables a burst gate signal, which is utilized to separate the burst component of the chrominance signal during the normal mode of operation, to be examined.

IC input terminal 113 is also used as a dual purpose terminal. During the normal mode of operation, IC input terminal 113 is intended to receive a contrast control voltage. When it is desired to activate the test mode, a voltage in a predetermined range (+1.8 to +2 volts) is applied to terminal 113. This may be accomplished by coupling the output of a reference voltage supply set to the appropriate voltage to IC terminal 113. A switching control unit 145, comprising a voltage comparator, controls the "position" of switching unit 137 and thereby the mode of IC 100 in response to the voltage developed at IC input terminal 113.

Clearly, for IC 100 to properly process received luminance and chrominance signals in the intended viewing environment of the television receiver, the voltage developed at IC input terminal 113 in response to the contrast control voltage coupled to terminal 113 must remain well above (greater than +2.2 volts) the predetermined range (+1.8 to +2 volts) used to activate the test mode. Normally, it is possible to choose component values which will ensure this criteria. However, when the contrast control signal is generated by combining two or more control signals which are generated by respective control circuits operating more or less independently of one another, as is the case in the illustrative embodiment, it may not be possible to ensure that the criteria is met for all conditions of the received television signal. This is especially so when the system is designed to provide relatively high amplitude picture tube drive signals.

For example, if the channel is changed from one with a television signal having a low average picture level to one having a high average picture level while the receiver is set to a high contrast condition, there is a sudden demand for beam current and beam current limiter 37 responds by decreasing its contrast control voltage. At the same time, anti-blister circuit 47 responds to the −Y output signal by decreasing its contrast control voltage also. As a result, the voltage at the IC input terminal 113 may drop so low (less than +2 volts) that the test mode is activated. In that case, chrominance demodulator 135 is bypassed and the burst gate test signal is coupled to G−Y output terminal 143 of IC 100. This causes a "green flash" to be displayed until the receiver reaches equilibrium again. It has been found that under certain circumstances, the receiver may even remain "locked-up" in the test mode.

To inhibit the voltage developed at IC input terminal 113 from reaching the range (+1.8 to +2.2 volts) for activating the test mode in response to the combined contrast control signal during the signal processing mode under signal conditions such as described above, a "soft clamp" 49, comprising a diode 51 and a resistor 53 connected in series, is connected between a point at which a positive clamping voltage greater than the test mode activation voltage (+5 volts) is available and IC input terminal 113. While the soft clamp 49 inhibits the voltage at terminal 113 from reaching the test mode activating voltage during the signal processing mode, it does not prevent the activation of the test mode when a reference voltage equal to the test mode activation voltage is directly coupled to terminal 113.

Diode 51 is normally reversed biased in response to the normal combined contrast control voltage (+4 to +7 volts) that may be expected to be developed at terminal 113. When a transient condition such as described above causes the combined contrast control voltage to drop, diode 51 will be rendered conductive. As a result, terminal 113 is clamped to the positive clamping voltage through resistor 53. Viewed another way, resistor 53 is effectively caused to shunt contrast control IC input terminal 113. This reduces the contrast control loop gain and inhibits the voltage at terminal from reaching the test mode activation voltage.

While the present invention has been described with reference to the contrast control function, it is also applicable to other control functions, such as the brightness control function, which are dynamically controlled in an image responsive manner. In addition other threshold devices, such as transistor or a Zener diode, may be used in the soft clamp. These and other modifications are intended to be within the scope of the presen invention defined by the following claims.

We claim:

1. Apparatus comprising:
signal processing means having a first mode of operation during which at least one received signal is processed in a predetermined manner to produce an output signal, and a second mode of operation during which said first mode of operation is inhibited; said signal processing means including an input terminal, and mode selection means responsive to the level of an input signal developed said input terminal for determining the mode of operation of said signal processing means; said signal processing means operating in said first mode when said input signal has an amplitude within a first amplitude range, and operating in said second mode when said input signal when said input signal has as amplitude within a second amplitude range;
first control means for generating a first control signal for controlling a property of said received signal when said signal processing means is operating in said first mode;
second control means for generating a second control signal for controlling said property of said received signal when said signal processing means is operating in said first mode;
combining means for combining said first and second control signals to produce a combined control signal which is coupled to said input terminal for controlling said property of said received signal when said signal processing means is operating in said first mode;
said first and second control means operating independently of each other to generate respective ones of said first and second control signals in a manner by which said combined signal may have an amplitude which is in said second range and thereby undesirably causes said signal processing means to operate in said second mode; and
selective inhibiting means coupled to said input terminal for inhibiting said input signal developed at said input terminal from extending into said second amplitude range in response to said combined control signal, but permitting said input signal to be within said second range in when a second mode activating signal is directly coupled to said input terminal.

2. The apparatus recited in claim 1, wherein:
said selective inhibiting means comprises a soft signal clamp which is coupled to said input terminal of said signal processing means and is responsive to said combined control signal.

3. The apparatus recited in claim 2, wherein:
said input signal, said combined control signal and said second mode activation signal comprise respective voltages; and
said soft signal clamp comprises a device having a predetermined threshold of conduction and a resistive element connected in series between a source of a voltage outside of said second amplitude range and said input terminal of said signal processing means; said device being rendered conductive when said combined control signal extends into said second amplitude range.

4. The apparatus recited in claim 1, wherein:
said signal processing means is included within an intergrated circuit and said input terminal is a terminal of said integrated circuit.

5. The apparatus recited in Claim 1, wherein:
said second mode is a testmode for testing said signal processing means.

6. A television system, comprising:
signal processing means having a first mode of operation during which at least one of a luminance signal and a chrominance signal is processed in a predetermined manner to produce an image-representative output signal, and a second mode of operation during which said first mode of operation is inhibited; said signal processing means including an input terminal, and mode selection means responsive to the level of an input signal developed said input terminal for determining the mode of operation of said signal processing means; said signal processing means operating in said first mode when said input signal has an amplitude within a first amplitude range, and operating in said second mode whem said input signal when said input signal has an amplitude within a second amplitude range;
means for coupling said image-representative output signal to a display device for displaying an image;
first control means for generating a first control signal for controlling a property of said received signal when said signal processing means is operating in said first mode in response to a characteristic of said image;
second control means for generating a second control signal for controlling said property of said received signal when said signal processing means operating in said first mode;
combining means for combining said first and second control signals to produce a combined control signal which is coupled to said input terminal for controlling said property of said received signal when said signal processing means is operating in said first mode;
said first and second control means operating independently of each other to generate respective ones of said first and second control signals in a manner by which said combined signal may have an amplitude which is in said second range and thereby undesirably causes said signal processing means to operate in said second mode; and selective inhibiting means coupled to said input terminal for inhibiting said input signal developed at said input terminal from extending said second amplitude range in response to said combined control signal, but permitting said input signal to be within said second range in when a second mode activating signal is directly coupled to said input terminal.

7. The television system recited in claim 6, wherein:
said display device comprises a picture tube including at least one electron gun for generating an electron beam in response to said image-representative output signal; said picture tube drawing beam current in response to said image-representative output signal; and said first means is responsive said beam current current drawn by said picture tube.

8. The television system recited in Claim 6, wherein:
said first means is responsive to said image-representative output signal.

9. The television system recited in claim 6, wherein:
said display device comprises a picture tube including at least one electron gun for generating an electron beam in response to said image-representative output signal; said picture tube drawing beam current corresponding to said electron beam;

said first means is responsive said beam current current drawn by said picture tube; and said second means is responsive to said image-representative output signal for generating said second control signal.

10. The television system recited in claim 9, further including:
third control means for generating a third control signal for controlling said property of said received signal when said signal processing means is operating in said first mode in accordance with a manually adjustable setting; and wherein said combining means combines said first, second and third control signals to produce said combined control signal; and said first, second and third control means operate independently of each other to generate respective ones of said first, second and third control signals in a manner by which said combined signal may have an amplitude which is in said second range and thereby undesirably causes said signal processing means to operate in said second mode.

11. The television system recited in claim 9, wherein:
said display device comprises a projection apparatus including said picture tube.

12. The television system recited in claim 6, wherein:
said second control means is responsive to an adjustment by a user.

13. The television system recited in claim 12, wherein:
said selective inhibiting means comprises a soft signal clamp which is coupled to said input terminal of said signal processing means and is resposive to said combined control signal.

14. The television system recited in claim 13, wherein:
said input signal, said combined control signal and said second mode activating signal comprise respective voltages; and said soft signal clamp comprises a device having a predetermined threshold of conduction and a resistive element connected in series between a source of a voltage outside of said second amplitude range and said input terminal of said signal processing means; said device being rendered conductive when said combined control signal extends into said second amplitude range.

15. The television system recited in claim 12, wherein:
said signal processing means is included within an integrated circuit and said input terminal is a terminal of said integrated circuit.

16. The television system recited in claim 12, wherein:
said second mode is a test mode for testing said signal processing means.

17. The televsion system recited in Claim 6, wherein:
said signal processing means includes contrast control means for controlling the contrast characteristic of said image; brightness control means for controlling the brightness characteristic of said image; means for coupling said input terminal to one said contrast and brightness control means; another input terminal; and means for coupling said other input terminal to the other one of said contrast and brightness control means; and said first control signal is coupled to said other terminal.

18. A television system, comprising:
signal processing means having a first mode of operation during which at least one of a luminance signal and a chrominance signal is processed in a predetermined manner to produce an image-representative output signal, and a second mode of operation during which said first mode of operation is inhibited; said signal processing means including an input terminal, and mode selection means responsive to the level of an input signal developed said input terminal for determining the mode of operation of sain signal processing means; said signal processing means operating in said first mode when said input signal has an amplitude within a first amplitude range, and operating in said second mode when said input signal when said input signal has an amplitude within a second amplitude range;

a picture tube;

means for coupling said image-representative output signal to said picture tube; said picture tube including at least one electron gun for generating an electron beam in response to image-representative signal; said picture tube drawing beam current in response to said image representative signal;

first control means for generating a first control signal for controlling a property of said received signal when said signal processing means is operating in said first mode in response to said beam current;

second control means for generating a second control signal for controlling said property of said received signal when said signal processing means is operating in said first mode in response to said image-representative output signal;

third control means for generating a third control signal for controlling said property of said received signal when said signal processing means is operating in said first mode in accordance with a manually adjustable setting;

combining means for combining said first and second control signals to produce a combined control signal which is coupled to said input terminal for controlling said property of said received signal when said signal processing means is operating in said first mode;

said first, second and third control means operating independently of each other to generate respective ones of said first, second and third control signals in a manner by which said combined signal may have an amplitude which is in said second range and thereby undesirably causes said signal processing means to operate in said second mode; and selective inhibiting means coupled to said input terminal for inhibiting said input signal developed at said input terminal from extending into said second amplitude range in response to said combined control signal, but permitting said input signal to be within said second range in when a second mode activating signal is directly coupled to said input termenal.

19. The television system recited in claim 18, wherein:
said picture tube is included within a projection display apparatus.

20. The televsion system recited in claim 18, wherein:
said signal processing means includes contrast control means for controlling the contrast characteristic of said image; brightness control means for controlling the brightness characteristic of said image; means for coupling said input terminal to one of said contrast and brightness control means; another input terminal; and means for coupling said other input terminal to the other one of said contrast and brightness control means; and said first control signal is coupled to said other terminal.

* * * * *

UNITED STATES PATENT AND TRADEMARK OFFICE
CERTIFICATE OF CORRECTION

PATENT NO. : 5,079,623
DATED : January 7, 1992
INVENTOR(S) : Gene K. Sendelweck, et al.

It is certified that error appears in the above-identified patent and that said Letters Patent is hereby corrected as shown below:

Column 7, line 43 (Claim 1): that portion reading "as" should read -- an --;

Column 8, line 12 (Claim 3): that portion reading "activation" should read -- activating --; line 27 (Claim 5): that portion reading "testmode" should read -- test mode --; line 44 (Claim 6): that portion reading "whem" should read -- when --; line 56 (Claim 6): that portion reading "means operating" should read -- means is operating --;

Column 10, line 39 (Claim 18): that portion reading "sain" should read -- said --;

Column 12, line 2 (Claim 18): that portion reading "termenal" should read -- terminal --.

Signed and Sealed this

First Day of June, 1993

Attest:

MICHAEL K. KIRK

*Attesting Officer*    Acting Commissioner of Patents and Trademarks